United States Patent
Green (10) Patent No.: US 10,822,982 B2
(45) Date of Patent: Nov. 3, 2020

(54) SEAL FOR A GAS TURBINE

(71) Applicant: ROLLS-ROYCE plc, London (GB)

(72) Inventor: Jeffrey S. Green, Derby (GB)

(73) Assignee: ROLLS-ROYCE plc, London (GB)

( * ) Notice: Subject to any disclaimer, the term of this patent is extended or adjusted under 35 U.S.C. 154(b) by 127 days.

(21) Appl. No.: 16/108,805

(22) Filed: Aug. 22, 2018

(65) Prior Publication Data

US 2019/0085709 A1    Mar. 21, 2019

(30) Foreign Application Priority Data

Sep. 20, 2017  (GB) .................................. 1715169.7

(51) Int. Cl.
| | | |
|---|---|---|
| *F01D 11/02* | (2006.01) | |
| *F01D 5/02* | (2006.01) | |
| *F01D 11/00* | (2006.01) | |
| *F16J 15/447* | (2006.01) | |

(52) U.S. Cl.
CPC .............. *F01D 11/02* (2013.01); *F01D 5/027* (2013.01); *F01D 11/001* (2013.01); *F16J 15/4476* (2013.01); *F05D 2240/55* (2013.01); *F05D 2260/96* (2013.01)

(58) Field of Classification Search
None
See application file for complete search history.

(56) References Cited

U.S. PATENT DOCUMENTS

| | | | |
|---|---|---|---|
| 4,361,213 A * | 11/1982 | Landis, Jr. ............. | F01D 11/02 188/378 |
| 4,784,012 A | 11/1988 | Marra | |
| 5,427,387 A | 6/1995 | Johnston | |
| 8,002,286 B1 | 8/2011 | El-Aini et al. | |
| 10,247,003 B2 * | 4/2019 | Himes ...................... | F01D 25/06 |
| 10,570,741 B2 * | 2/2020 | Stone ....................... | F01D 5/027 |
| 2015/0285152 A1 | 10/2015 | Hayford et al. | |
| 2016/0237824 A1 * | 8/2016 | Himes ...................... | F16F 15/34 |
| 2016/0327065 A1 | 11/2016 | Boewing | |

FOREIGN PATENT DOCUMENTS

| | | |
|---|---|---|
| EP | 2141363 | 1/2010 |
| JP | 2013142435 | 7/2013 |

OTHER PUBLICATIONS

Great Britain Search Report dated Feb. 13, 2018, issued in GB Patent Application No. 1715169.7.

* cited by examiner

*Primary Examiner* — Brian P Wolcott
*Assistant Examiner* — Jason G Davis
(74) *Attorney, Agent, or Firm* — Oliff PLC (57) ABSTRACT

A rotor is provided comprising a centre of mass and a rotational axis and a rotor sealing component extending circumferentially around the rotor for sealing between the rotor and a stator, wherein the centre of mass of the rotor is coincident with the rotational axis, and material of the rotor sealing component is not evenly distributed around its circumference. A stator sealing component in which the material is not evenly distributed around its circumference is also provided.

8 Claims, 6 Drawing Sheets

SEAL FOR A GAS TURBINE

CROSS-REFERENCE TO RELATED APPLICATIONS

This application is based upon and claims the benefit of priority from British Patent Application Number 1715169.7 filed 20 Sep. 2017, the entire contents of which are incorporated by reference.

BACKGROUND

Technical Field

The present disclosure concerns a rotor and/or stator, a seal between a rotor and stator, gas turbine engines, and a method of de-tuning a seal between a rotor and a stator.

Description of the Related Art

In pressurised rotating machinery, for example a gas turbine engine, rotating parts, for example a rotor, must be sealed against static parts, for example a stator, in order to prevent fluid leakage between them. Typically a tortuous path is provided between the rotor and stator, for example a labyrinth seal, in order to minimise flow through the seal whilst also minimising frictional effects between the rotor and stator.

A gas turbine engine uses seals between rotors and stators within the engine core to manage the core airflow. For example the fan blades of the gas turbine are coupled to a rotor that is further coupled to a shaft. The fan blade rotor must rotate with respect to adjacent stators. The stators may be part of the engine support structure. Alternatively the seal may be provided between two rotating parts of a gas turbine engine, that are rotating at different angular velocities.

Figure 1:
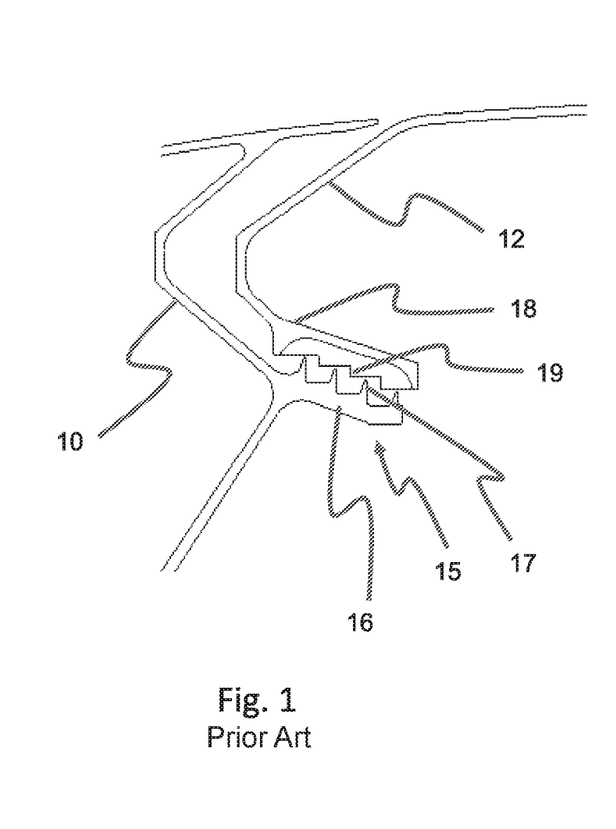
FIG. 1 is a typical stepped labyrinth seal between a rotor and a stator.

An example of a typical seal 15 is shown in FIG. 1. The seal 15 is located between a rotor 10 and a stator 12. In gas turbines, typically seals may be labyrinth seals, as shown in the FIG. 1 example. FIG. 1 shows a stepped labyrinth seal. A stator sealing component 18 comprises steps 19. Fins 17 of a rotor sealing component 16 extend from the rotor sealing component 16 and are presented to a flat portion of the steps 19.

Labyrinth seals of the type described typically have a large radius (in relation to the seal clearance) and comprise a slim structure in order to minimise weight and/or cost.

Figure 2:
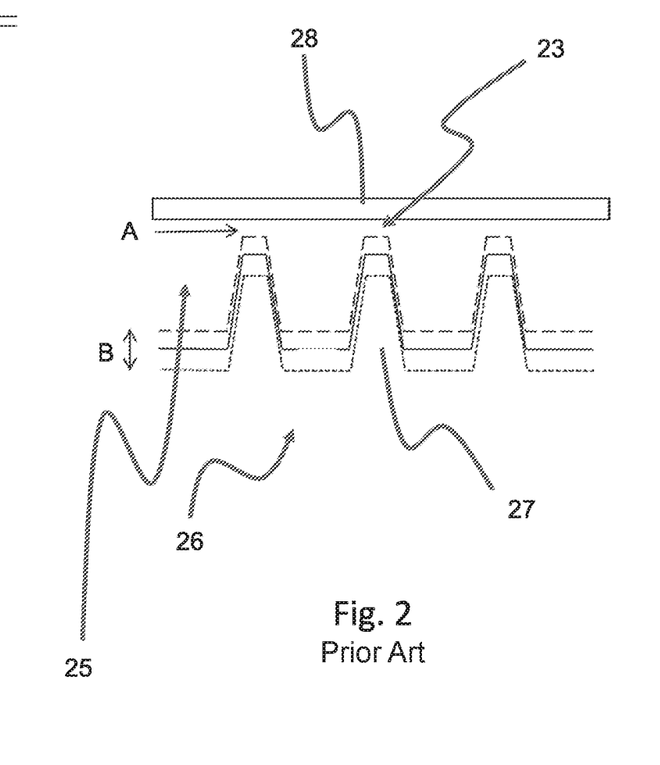
FIG. 2 shows a typical straight labyrinth seal.

FIG. 2 shows a straight section of a labyrinth seal 25 of a gas turbine between a rotor sealing component 26 and a stator sealing component 28. During operation, the seal experiences a pressure difference across the seal. As a result an airflow A, shown in the FIG. 2 example, is present through the seal 25 from the side of the seal at higher pressure to the side of the seal at lower pressure. Airflow is minimised by a tortuous path of, for example, the labyrinth seal. Minimising the airflow through a seal of a gas turbine engine may minimise leakage flow of a working fluid and maintains the pressure difference across the seal, both of which can contribute to engine performance. The fins 27, steps (when present) and length of the seal all contribute to minimising the airflow therethrough.

However the rotor vibrates during operation. This vibration may cause movement of the rotor sealing component 26, for example radial (as shown by B in FIG. 2) or axial movement. The radial movement B can affect a radial sealing gap 23 i.e. a distance between the rotor seal component 26 and the stator seal component 28. As the distance between the rotor and stator varies due to vibration, the airflow A through the seal is affected. For example it experiences a compression force as the rotor sealing component 26 moves towards the stator sealing component 28.

Structures such as typical rotor discs, which can be substantially axisymmetric structures, generally have modes of vibration which come in pairs. These modes can combine in order to produce travelling waves in the structure. In this scenario the deflected shape of the rotor disc, due to vibration, appears to rotate about the structure. Due to the interaction of the travelling wave in the rotor and the airflow through the seal, flutter can be experienced. Flutter can cause loss or damage to the slim structure of the seal and hence an engine performance penalty and/or an engine integrity threat that may lead to in flight shut-down.

Therefore it is desirable to minimise the flutter effect within the seal between a rotor and a stator.

SUMMARY

According to an aspect there is provided a rotor with a principal axis and a rotational axis, comprising a rotor sealing component extending circumferentially around the rotor for sealing between the rotor and a stator. The principal axis of the rotor is collinear with the rotational axis. Material of the rotor sealing component is unevenly distributed around the circumference of the rotor sealing component.

According to an aspect there is provided a method of reducing flutter in a rotor, wherein the rotor comprises a rotor sealing component for sealing with a stator, the method comprising the steps of adding one or more balancing masses and/or circumferential masses and balancing masses to the rotor sealing component such that the rotor is in accordance with a rotor as described and/or claimed herein.

Material may not be distributed regularly around the circumference of the rotor sealing component. The material of the rotor may form the structure of the rotor. The material of the rotor may be all solid parts of the rotor. The unevenly distributed material may be arranged such that it prevents vibrational modes that cause travelling waves around the circumference of the rotor. The unevenly distributed material may be arranged such that the unevenly distributed material minimises the effects of flutter.

The principal axis of the rotor may be the inertial axis. The principal axis may be defined as the line formed by the centre of mass of each cross section, perpendicular to the rotational axis, taken through the rotor.

The rotor may be in balance. When the principal axis of the rotor is collinear with the rotational axis the rotor may be in balance. The rotor may have no aspect of rotational symmetry. The rotor may have an aspect of rotational symmetry. The rotor may have an aspect of rotational symmetry less than 6, 5, 4 or 3. The rotor may have a low aspect of rotational symmetry. The rotor may not be axisymmetric.

The rotor sealing component may be a labyrinth seal. The labyrinth seal may be straight or stepped. The labyrinth seal may comprise fins. The labyrinth seal may comprise steps.

The rotor sealing component may project away from the rotor, and a portion of the rotor sealing component may provide a seal between the rotor and a stator. The rotor sealing component may be a projection that extends away from the rotor. A portion of the projection may provide a seal between the rotor and a stator.

The seal may be between a radially outer surface of the rotor sealing component and a stator. The rotor sealing component may be a projection. The projection may have an end proximal the rotor. The projection may have an end distal the rotor.

The rotor sealing component may comprise a plurality of balancing masses at discrete circumferential locations.

The balancing masses may be joined or integral. The balancing masses may be balancing lands. The balancing masses may prevent the formation of travelling waves around the rotor and/or rotor sealing component. The balancing masses may alter the localised stiffness and/or vibrational response of the rotor sealing component for preventing the formation of travelling waves around the rotor.

The discrete circumferential locations may have an aspect of rotational symmetry. The discrete circumferential locations may be arranged such that the balancing masses balance the rotor.

The rotor sealing component may be axisymmetric without the balancing masses. The material of the rotor sealing component without the balancing masses may be evenly distributed around the circumference of the rotor sealing component. The material of the balancing masses at discrete circumferential locations is not evenly distributed around the circumference of the rotor sealing component.

The balancing masses may be added to a radially inner surface of the rotor sealing component. The balancing masses may be added to an end of the rotor sealing component that is distal to the rotor.

The balancing masses may all be of the same weight and/or size. The balancing masses may be different weights and/or sizes.

The balancing masses may be all the same weight and the locations of the balancing masses may have an order of rotational symmetry equal to the number of balancing masses.

The rotor sealing component may comprise an eccentric circumferential mass and one or more balancing masses.

The circumferential mass may be joined or integral to the rotor sealing component. The balancing mass may be joined or integral to the rotor sealing component. The eccentric circumferential mass may be at the same axial position, with respect to the rotational axis, as the one or more balancing masses.

The balancing mass may be located at a discrete circumferential location on the sealing component.

The balancing mass may be joined or integral to the rotor sealing component.

The rotor sealing component may comprise an eccentric circumferential mass. The rotor may comprise a second circumferential mass. The eccentric circumferential mass may be radially offset from the second circumferential mass.

The second circumferential mass may be joined or integral to the rotor. The second circumferential mass may be joined or integral to a different part of the rotor to the rotor sealing component. The second circumferential mass may be located at the same axial location as the eccentric circumferential mass.

According to an aspect there is provided a stator comprising a stator sealing component extending circumferentially around the stator for sealing between the stator and a rotor. Material of the stator sealing component is not evenly distributed around its circumference.

According to an aspect there is provided a method of reducing flutter in a stator, wherein the stator comprises a stator sealing component, the method comprising the steps of adding one or more masses to the stator sealing component such that the stator is in accordance with a stator as described and/or claimed herein.

Material may not be distributed regularly around the circumference of the stator sealing component. The material of the stator may form the structure of the stator. The material of the stator may be all solid parts of the stator.

The stator sealing component may be a labyrinth seal. The labyrinth seal may be straight or stepped. The labyrinth seal may comprise fins. The labyrinth seal may comprise steps.

The stator sealing component may project away from the stator, and a portion of the stator sealing component may provide a seal between the stator and a rotor.

The seal may be between a radially inner surface of the stator sealing component and a rotor. The stator sealing component may be a projection. The projection may have an end proximal the stator. The projection may have an end distal the stator.

The stator sealing component may comprise one or more balancing masses at one or more circumferential locations.

The balancing masses may be joined or integral.

The balancing masses may be added to a radially outer surface of the stator sealing component. The balancing masses may be added to an end of the stator sealing component that is distal to the stator.

The balancing masses may all be of the same weight and/or size. The balancing masses may be different weights and/or sizes.

The stator sealing component may comprise an eccentric circumferential mass.

According to an aspect there is provided a rotor stage for a gas turbine engine comprising a rotor as described and/or claimed herein and a plurality of rotor blades connected to, or integral with, the rotor.

According to an aspect there is provided a seal comprising a rotor as described and/or claimed herein and a stator. The rotor sealing component seals between the rotor and stator.

According to an aspect there is provided a seal comprising a stator as described and/or claimed herein and a rotor. The stator sealing component seals between the stator and the rotor According to an aspect there is provided a gas turbine engine comprising a seal as described and/or claimed herein.

The method of reducing flutter in a rotor and/or a stator prevents the formation of travelling waves around the circumference of the rotor and/or stator.

The rotor and/or stator as described and/or claimed herein can prevent the formation of travelling waves around a labyrinth seal, for example in a gas turbine. The rotor and/or stator as described and/or claimed herein can minimise the effect of flutter. By minimising the effect of flutter the life of the seal is increased, as flutter can damage the seal. If the seal is damaged, the airflow through the seal may increase at the detriment of engine performance, and/or the damage may cause an engine integrity threat. By minimising the effect of flutter the seal may be thinner and lighter thereby reducing the weight and/or cost of the seal.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 3:
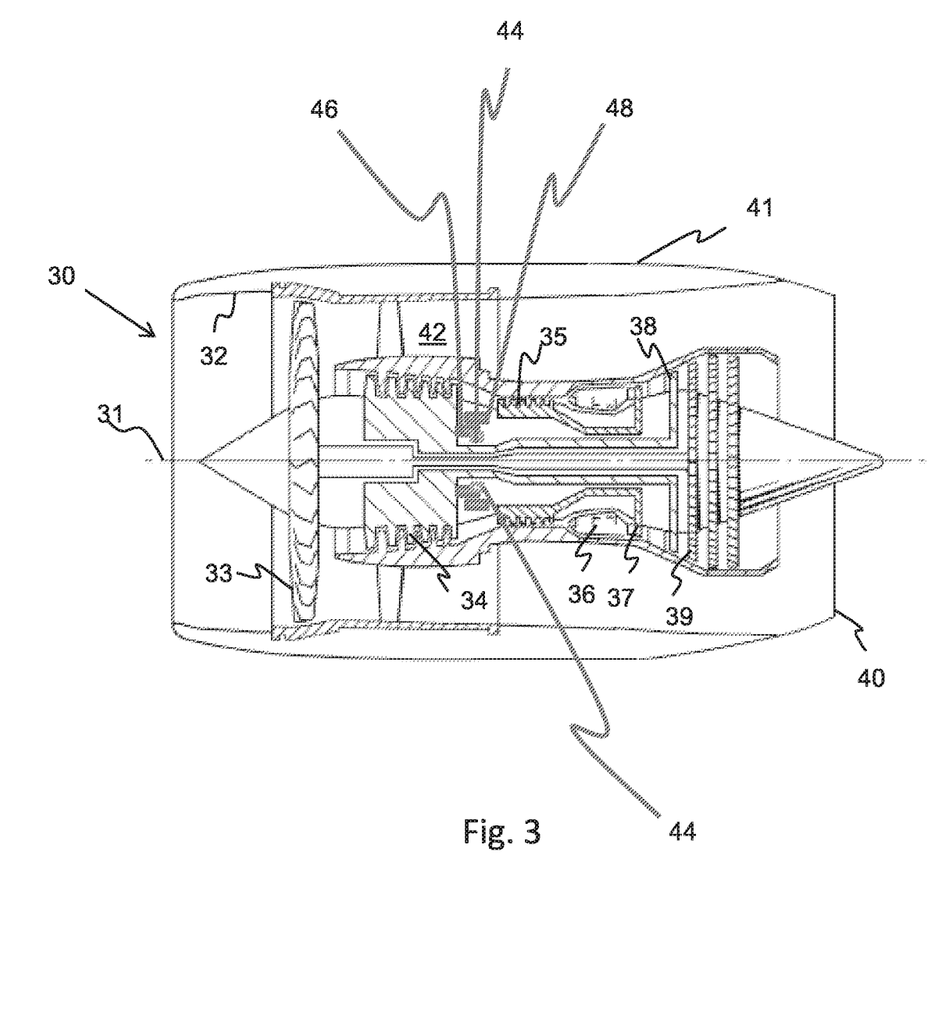
FIG. 3 shows a sectional side view of a gas turbine engine comprising a seal as described and/or claimed herein.

With reference to FIG. 3, a gas turbine engine is generally indicated at 30, having a principal and rotational axis 31. The engine 30 comprises, in axial flow series, an air intake 32, a propulsive fan 33, an intermediate pressure compressor 34, a high-pressure compressor 35, combustion equipment 36, a high-pressure turbine 37, an intermediate pressure turbine 38, a low-pressure turbine 39 and an exhaust nozzle 40. A nacelle 41 generally surrounds the engine 30 and defines both the intake 32 and the exhaust nozzle 40.

In the FIG. 3 example blades of the intermediate compressor 34 can be seen to extend radially away from a central rotor. A rotor sealing component 46 extends axially away from the intermediate compressor in the FIG. 3 example. The rotor sealing component is an annular ring. A stator sealing component 48 is positioned adjacent the rotor sealing component 46. The rotor sealing component 46 and stator sealing component 48 act to provide a seal between the rotor of the intermediate compressor 34 and a stator. For example the rotor sealing component 46 and the stator sealing component 48 may form a labyrinth seal. The seal may prevent the leakage of the working fluid from the intermediate compressor 34 into an internal structure of gas turbine engine that is at a lower pressure than in the intermediate compressor 34. The stator sealing component 48 is attached to a non-rotating structure of the gas turbine engine. Two balancing masses 44 as described and/or claimed herein are attached to the rotor sealing component 46 at opposing sides of the rotor sealing component 46. The balancing masses 44 are for minimising the effect of flutter in the seal.

The FIG. 3 example shows a seal attached to the intermediate compressor 34; however there may be similar seals between any other, or all other, interfaces between rotating components and static components and/or between two or more rotating components that rotate at different angular velocities. The FIG. 3 example shows two balancing masses 44 however in alternative embodiments the gas turbine engine may comprise an alternative arrangement of masses as described and/or claimed herein.

The gas turbine engine 30 works in the conventional manner so that air entering the intake 32 is accelerated by the fan 33 to produce two air flows: a first air flow into the intermediate pressure compressor 34 and a second air flow which passes through a bypass duct 42 to provide propulsive thrust. The intermediate pressure compressor 34 compresses the air flow directed into it before delivering that air to the high pressure compressor 35 where further compression takes place.

The compressed air exhausted from the high-pressure compressor 35 is directed into the combustion equipment 36 where it is mixed with fuel and the mixture combusted. The resultant hot combustion products then expand through, and thereby drive the high, intermediate and low-pressure turbines 37, 38, 39 before being exhausted through the nozzle 40 to provide additional propulsive thrust. The high 37, intermediate 38 and low 39 pressure turbines drive respectively the high pressure compressor 35, intermediate pressure compressor 34 and fan 33, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 4:
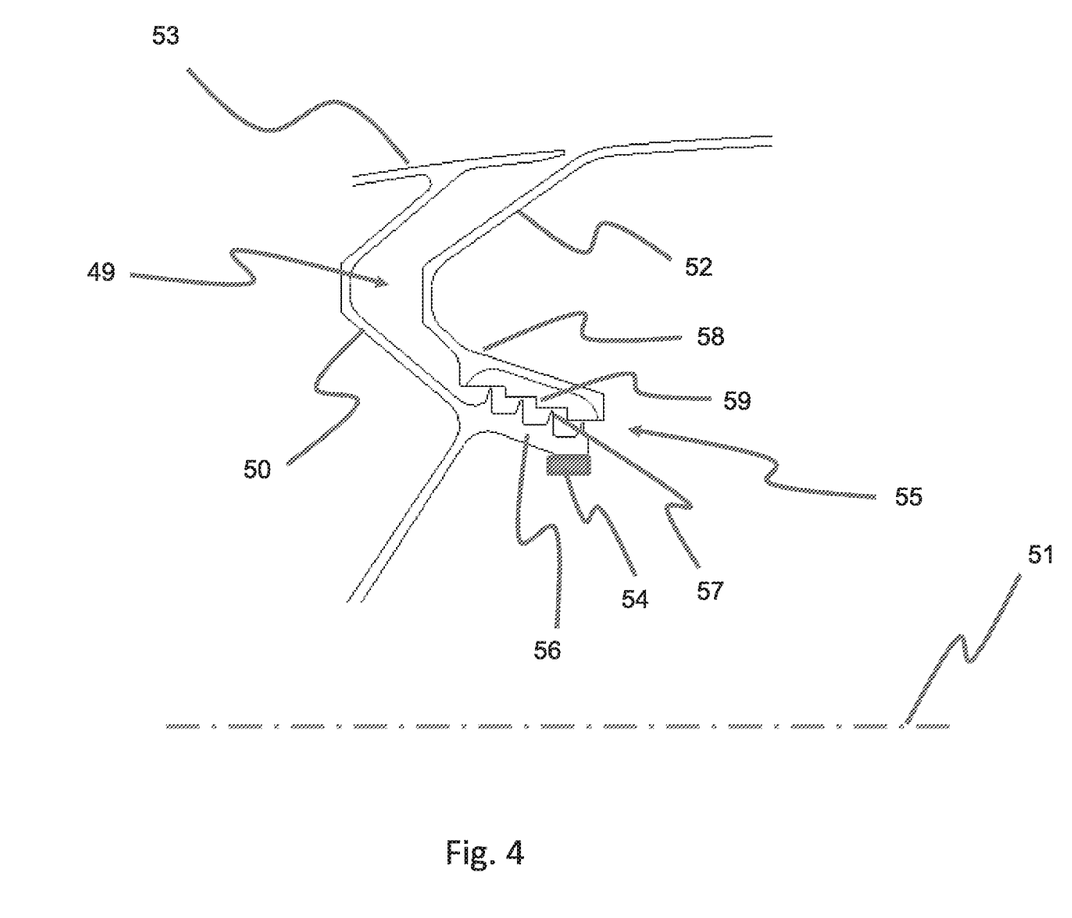
FIG. 4 shows a sectional side view of a seal as described and/or claimed herein wherein the rotor sealing component comprises balancing masses.

FIG. 4 shows a side view of a seal 55 between a rotor 50 and a stator 52. The rotor rotates about a rotor rotational axis 51. The rotor rotational axis 51 may be coincident with the rotational axis of the gas turbine engine, for example rotational axis 31 in FIG. 3. The principal axis of the rotor 50 may be collinear with the rotor rotational axis 51. The rotor 50 comprises a rotor sealing component 56. The rotor sealing component 56 comprises fins 57. The stator 52 comprises a stator sealing component 58. The stator sealing component 58 comprises steps 59. The rotor sealing component 56 and stator sealing component 58 form a labyrinth seal 55. A balancing mass 54 is attached to the rotor sealing component 56.

The rotor 50 in FIG. 4 comprises a working surface 53. The working surface can be gas washed on its radially outer surface (with respect to the rotor rotational axis 51). For example the gas may be a working fluid of a gas turbine engine. Blades, for example fan blades, may be attached the radially outer surface of the working surface 53. The rotor extends from the working surface 53 towards the rotor rotational axis 51. As can be seen in the FIG. 4 example, the rotor 53 comprises a thin structure. The cross sectional structure of the rotor as shown in FIG. 4 extends around the circumference of the rotor rotational axis 51. The shape of each rotor and stator in a gas turbine engine will be designed based on a variety of constraints, for example constraints of space, required strength and thermal considerations, and therefore whilst the rotor 50 and stator 52 shown in FIG. 4 have a defined shape, this is only an example and rotors and stators may have a variety of shapes.

Extending axially (with respect of the rotor rotational axis 51) away from the rotor 50 is the rotor sealing component 56. The rotor sealing component 56 may be an annular ring, and may be attached to the rotor about its circumference. The rotor sealing component 56 may be formed integrally with the rotor 50. As can be seen in the FIG. 4 example, the thickness of the rotor sealing component 56 is greater than the thickness of the rotor 50, however in other embodiments the rotor sealing component 56 may be the same thickness or be thinner than the rotor 50 structure. The rotor sealing component 56 is frustoconical in the FIG. 4 example but may be any suitable shape, including, for example, cylindrical. The end of the rotor sealing component 56 distal to the rotor 50 is closer to the rotor rotational axis 51 that the end of the rotor sealing component 56 proximal the rotor 50. The radially outer surface of the rotor sealing component 56 comprises fins 57. The fins 57 extend radially away from the rotor sealing component 56. The fins 57 also extend around the circumference of the rotor sealing component 56. Each fin 57 may extend around the same axial position about its circumference, or in alternative embodiments a/each fin 57 may vary its axial position about its circumference. For example a/each fin 57 may define a wavy circumferential pattern.

The stator 52 comprises a stator sealing component 58 that extends axially away from the stator 52. The stator sealing component 58 is arranged to engage the fins 57 of the rotor sealing component 56. The stator sealing component 58 may be frustoconical.

The rotor sealing component 56 and the stator sealing component 58 form a labyrinth seal 55. The FIG. 4 example shows a typical labyrinth seal within a gas turbine engine. For example the fins 57 extend towards the stator sealing component 58. The fins 57 may be arranged such that they do not contact the stator sealing component 58 during operation. Alternatively the fins may contact the stator sealing component 58. For example the stator sealing component 58 may comprise an abradable liner, and the fins 57 may wear a portion of the abradable liner during engine operation. The stator sealing component 58 comprises steps 59 on its radially inner surface. The steps 59 are arranged such that each fin 57 extends towards a surface of the stator sealing component 58 that is flat with respect to the rotor rotational axis 51.

The arrangement of the rotor 50 and stator 52 of FIG. 4 defines a pocket 49 between the rotor 50 and stator 52. This pocket 49 extends between the working surface 53 of the rotor 50 and the labyrinth seal 55. This pocket 49 will be at substantially the same pressure as the gas on the radially outer surface of the working surface 53 (although there may be aerodynamic losses and effects). The end of the labyrinth seal proximal the pocket 49 will be at the pressure of the pocket 49. The end of the labyrinth seal distal the pocket 49 may be at a higher pressure, for example because the cavity that this end extends into is at a higher pressure for generating loads on the structure, keeping oil in the bearings and for cooling. Therefore an airflow will be present from the cavity, through the labyrinth seal, to the pocket 49. However in other embodiments a pocket may not be present. In other embodiments the upstream and downstream ends of a labyrinth seal may connect, for example, two cavities of the gas turbine structure or a cavity and the working fluid.

A balancing mass 54 is attached to the end of the rotor sealing component 56 distal to the rotor 50. The balancing mass 54 may be of a weight suitable for influencing the vibration of the rotor 50. The balancing mass 54 may be welded to the rotor sealing component 56. The balancing mass 54 may be attached to the rotor sealing component 56 by a method suitable for the operating conditions of the gas turbine. The balancing mass 54 may be integral with the rotor sealing component 56. The balancing mass 54 is shown as a rectangular block in the FIG. 4 example; however the balancing mass 54 may have other shapes in other embodiments.

Axi-symmetric structures such as typical rotors may have modes of vibration that can cause travelling waves around their circumference. A typical labyrinth seal may be axi-symmetric and therefore travelling waves may cause flutter within the seal. The rotor 50 and/or the rotor sealing component 56 (which comprise the balancing masses 54) may be non-axisymmetric. Travelling waves are less likely to form in non-axisymmetric structures as modes of vibration that can cause travelling waves may not be present. The presence of the balancing mass 54 may break up a travelling wave and helps to minimise flutter in the labyrinth seal 55.

The effect described above has been described in relation to the FIG. 4 example, however the effect of using a non-axisymmetric rotating structure as described and/or claimed herein to prevent flutter can be applied to any rotating component.

Only half of the cross section of the rotor 50 and stator 52 are shown in FIG. 4. As described, the rotor 50 and stator 52 extend around the circumference of the rotor rotational axis 51. A second balancing mass corresponding to balancing mass 54 is positioned opposite (with respect to the rotor rotational axis 51) balancing mass 54, for example in the manner of the positions of balancing masses 44 in FIG. 3.

The rotor 50 may have a principal axis (or inertial axis). The principal axis is defined by the centre of mass of each cross section, perpendicular to the rotational axis, taken through the rotor 50. Generally, if the principal axis is collinear (e.g. aligned) with the rotational axis then the rotor is said to be in balance.

The arrangement of FIG. 4 will be described further with respect to FIG. 5a. By including two balancing masses opposite each other the principal axis is collinear with the rotor rotational axis 51 i.e. the whole rotor structure is in balance. This prevents excess vibration during operation. Therefore the whole rotor structure shown in FIG. 4, including the rotor 50, the working surface 53, the rotor sealing component 56 and the balancing masses 54 (only one shown) is non-axisymmetric (due for example to the locations of the balancing masses 54) but in balance. The rotor sealing component 56 (comprising the balancing masses 54) is non-axisymmetric but in balance.

Figure 5A:
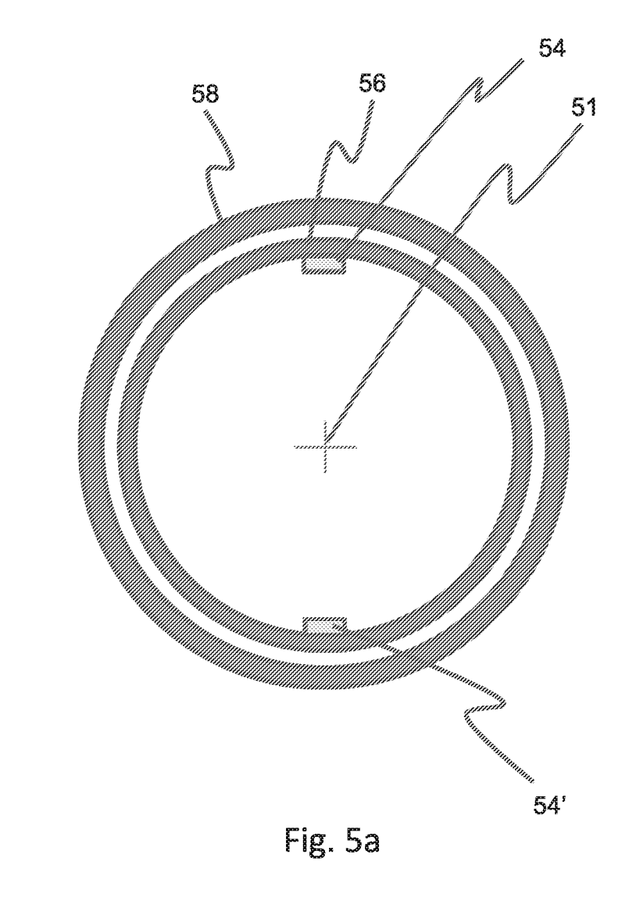
FIG. 5a shows an axial view of a seal as described and/or claimed herein wherein the rotor sealing component comprises balancing masses.

FIG. 5a shows diagrammatically an axial view of the embodiment shown in FIG. 4. A stator sealing component 58 surrounds a rotor sealing component 56. Two balancing masses 54 and 54' are attached to the rotor sealing component 56.

The balancing masses 54 and 54' are shown as rectangular blocks in the FIG. 5a example; however they may take other shapes in other embodiments. In FIG. 5a they are sized such that they are positioned at a substantially discrete circumferential location. For example their circumferential extent is small compared to the full circumference. In other embodiments the balancing masses 54 and 54' may be circumferentially different, for example greater in size compared to the FIG. 5a example.

The rotor sealing component 56 (comprising the balancing masses 54, 54') of FIG. 5a is non-axisymmetric. If the balancing masses were not present in the FIG. 5a example then the rotor sealing component 56 may be axi-symmetric. The inclusion of balancing masses, for example as shown in the FIG. 5a example, may result in a rotor sealing component becoming non-axisymmetrical. The rotor sealing component 56 and the stator sealing component 58 may be frustoconical as shown in the FIG. 4 example, or they may take another form e.g. they may be straight and/or cylindrical. With the addition of the balancing masses 54 and 54', the whole structure (e.g. the whole material), including the rotor sealing component 56, the stator sealing component 58 and the balancing masses 54 and 54' is non-axisymmetric but still in balance.

As a travelling wave may appear and progress around the circumference of the seal, for example in an airflow between the rotor sealing component 56 and the stator sealing component 58, as the travelling wave reaches a position of a balancing mass 54 or 54', the stiffness of the rotor sealing component 56 changes and this may, for example, disrupt the travelling wave. For example, the pair of modes which occur in structures (for example substantially axisymmetric structures) are affected differently by the presence of the masses. Each mode may change frequency to a different degree which disrupts the travelling waves.

Figure 5B:
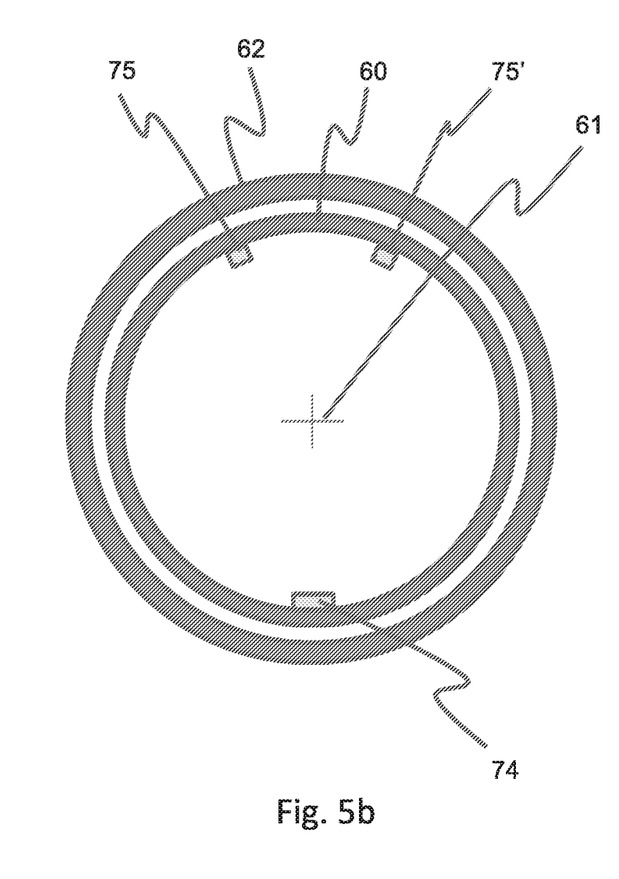
FIG. 5b shows an alternative of the FIG. 5a example.

FIG. 5b shows an alternative arrangement of the FIG. 5a embodiment. In the FIG. 5b example, there are three balancing masses. Two of the balancing masses 75 and 75' are smaller than the other balancing mass 74. The smaller balancing masses 75 and 75' are positioned at different discrete circumferential locations compared to one another. The larger balancing mass 74 is positioned at a circumferential location that is opposite the circumferential location of the centre of mass of the two smaller balancing masses 75 and 75'.

Whilst in FIG. 5b the balancing masses 75, 75' are shown to be different sizes to the balancing mass 74, their sizes are only representative of their relative weights in FIG. 5b. For example balancing mass 75 may be the same size as balancing mass 74 but have a different density.

FIG. 5b presents an arrangement whereby the rotor is in balance, but non axi-symmetric with no aspects of rotational symmetry. In contrast, FIG. 5a presents an arrangement whereby the rotor is in balance, is non-axi-symmetric but has an aspect of rotational symmetry. Other embodiments of the FIG. 5a example may include more than two balancing masses of equal weight positioned such that they have an aspect of rotational symmetry. Providing the rotor is in balance and non-axisymmetric as described and/or claimed herein the balancing masses may reduce the effect of flutter, whether the rotor has an aspect of rotational symmetry or not.

Figure 6A:
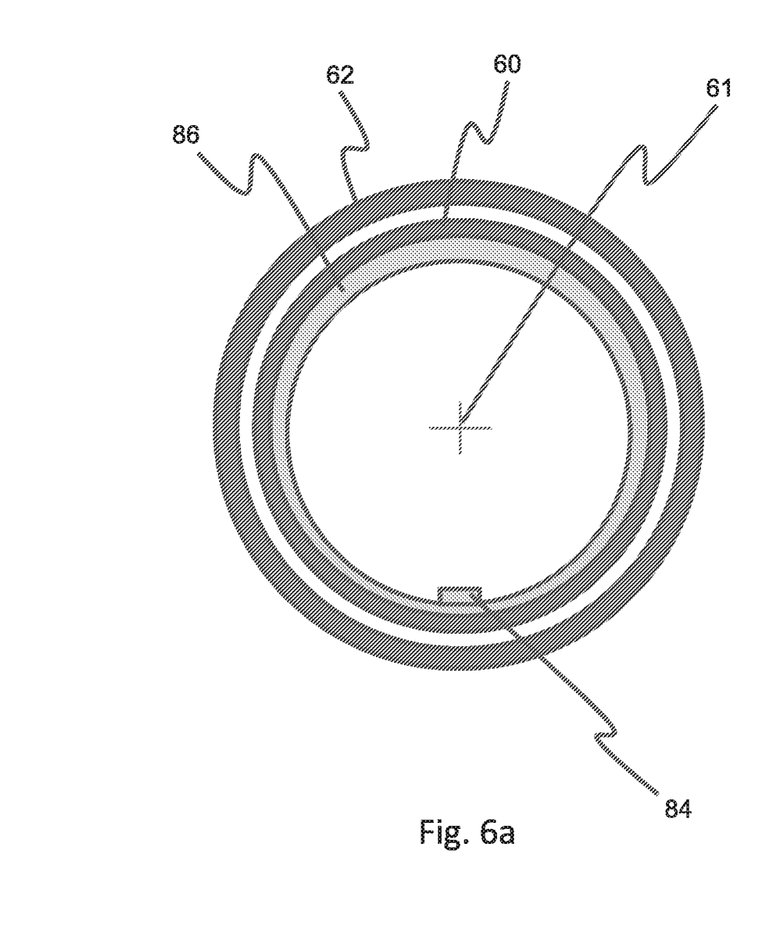
FIG. 6a shows an axial view of a seal as described and/or claimed herein comprising an eccentric circumferential mass.

FIG. 6a shows an axial view of an alternative arrangement of balancing masses. FIG. 6a shows a rotor sealing component 60 and a stator sealing component 62 with a gap defined therebetween. FIG. 6a further shows an eccentric circumferential mass 86 (e.g. an eccentrically machined circumferential mass) and a balancing mass 84. The stator sealing component 62 may be axi-symmetric. The rotor sealing component 60 (comprising the circumferential mass 86) may be non-axisymmetric. If the rotor sealing component 60 did not comprise the circumferential mass 86 then it may be axi-symmetric.

The eccentric circumferential mass 86 is attached to (e.g. welded to or formed with) the rotor sealing component 60 in the same manner as shown in FIG. 4. The circumferential mass 86 may be attached to the rotor sealing component 60 or it may be integral with the rotor sealing component 60. The balancing mass 84 may be attached to the rotor sealing component 60 or be integral with the rotor sealing component 60. Alternatively or additionally it may be attached or integral with the circumferential mass 86. The balancing mass 84 is arranged at a circumferential position such that the combined centre of mass of the circumferential mass 86 and the balancing mass 84 is coincident with the rotor rotational axis 61. Accordingly, FIG. 6a represents an example wherein the whole rotor is in balance, non-axisymmetric (due to the circumferential mass 86 and the balancing mass 84) but does not have an aspect of rotational symmetry.

The circumferential mass 86 may be eccentrically machined. The thickness of the circumferential mass 86 varies around its circumference. For example the thickness of the circumferential mass 86 may vary gradually around its circumference with a point of maximum thickness that is opposite a point of minimum thickness. The centre of the radially outer circular surface of the circumferential mass 86 may be different to the centre of the radially inner circular surface of the circumferential mass 86. The balancing mass 84 may be positioned at a point of minimum thickness of the circumferential mass 86. The balancing mass 84 is positioned at the same axial position as the circumferential mass 86 with respect to the rotor rotational axis 61.

The circumferential mass 86 also acts to minimise flutter by disrupting traveling waves about the rotor sealing component 60. For example with the addition of the circumferential mass 86 the thickness of the rotor sealing component, and its stiffness varies about the circumference. This asymmetry prevents the formation of pairs of vibrational modes that can lead to the formation of travelling waves.

In other embodiments the arrangement shown in FIG. 6a may comprise more circumferential masses or balancing masses provided that the rotor is in balance.

Figure 6B:
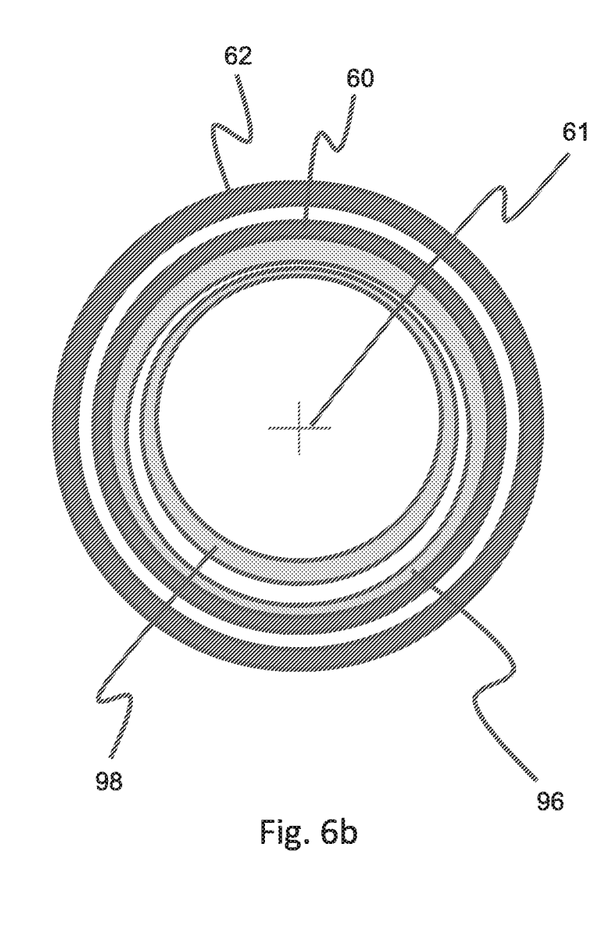
FIG. 6b shows an alternative of the FIG. 6a example.

FIG. 6b shows an alternative arrangement to FIG. 6a whereby a second circumferential mass is used to balance the first circumferential mass, instead of a balancing mass as in the FIG. 6a example. FIG. 6b shows a first circumferential mass 96 and a second circumferential mass 98. The first circumferential mass 96 is attached or integral to the rotor sealing component 60. A second circumferential mass 98 is attached or integral to a different part of the rotor. The different part of the rotor may be a part of the rotor at a smaller radius than the rotor sealing component. The different part of the rotor may be spaced from the rotor sealing component. The second circumferential mass 98 is located at the same axial position, with respect to the rotor rotational axis, as the first circumferential mass 96, but has a different radius. The second circumferential mass 98 may be radially spaced from the first circumferential mass 96. There may be a gap between the first circumferential mass 98 and the second circumferential mass 98. The combination of the first circumferential mass 96 and the second circumferential mass 98 balances the rotor.

The material of the rotor and/or rotor sealing components of FIGS. 4, 5a, 5b, 6a and 6b may be unevenly (e.g. not be evenly) distributed around the circumference of the rotor. Unevenly distributed material may be not regularly distributed and/or non-homogenously distributed and/or non-uniformly distributed. Material of a rotor and/or stator that is unevenly (e.g. not evenly) distributed around the circumference of the rotor and/or stator but still have a low aspect of rotational symmetry.

For example, FIG. 5a shows an arrangement in which the combined material of the rotor sealing component 56 and the balancing masses 54 and 54' is not evenly distributed around the circumference of the rotor. The material of a typical rotor sealing component (for example a rotor sealing component without balancing masses) may be evenly distributed around the circumference of the rotor. FIG. 5a shows an arrangement in which the material of the rotor sealing component 56 (that comprises balancing masses 54, 54') is evenly distributed around the circumference of the rotor. In FIG. 5a, the material of the rotor sealing component 56 (comprising the balancing masses 54 and 54') has a low aspect of rotation symmetry i.e. an aspect of rotational symmetry of two.

For example, FIG. 5b shows an arrangement in which the combined material of the rotor sealing component 60 and the balancing masses 75, 75' and 74 is not evenly distributed around the circumference of the rotor. FIG. 5b shows an arrangement in which the material of the rotor sealing component 60 (comprising the balancing masses 74, 75 and 75') is not evenly distributed around the circumference of the rotor. In FIG. 5b, the material of the rotor sealing component 60 (comprising the balancing masses 75, 75' and 74) has no aspect of rotation symmetry.

The arrangement of masses as described and/or claimed herein can prevent the formation of travelling waves around a labyrinth seal, for example in a gas turbine, and thereby minimise the effects of flutter and/or eliminate or substantially eliminate flutter. This increases the life of the seal due to the reduced effect of flutter, which can damage the seal. If the seal is damaged, the airflow through the seal may increase at the detriment of engine performance, and/or the damage may cause an engine integrity threat.

Figure 7:
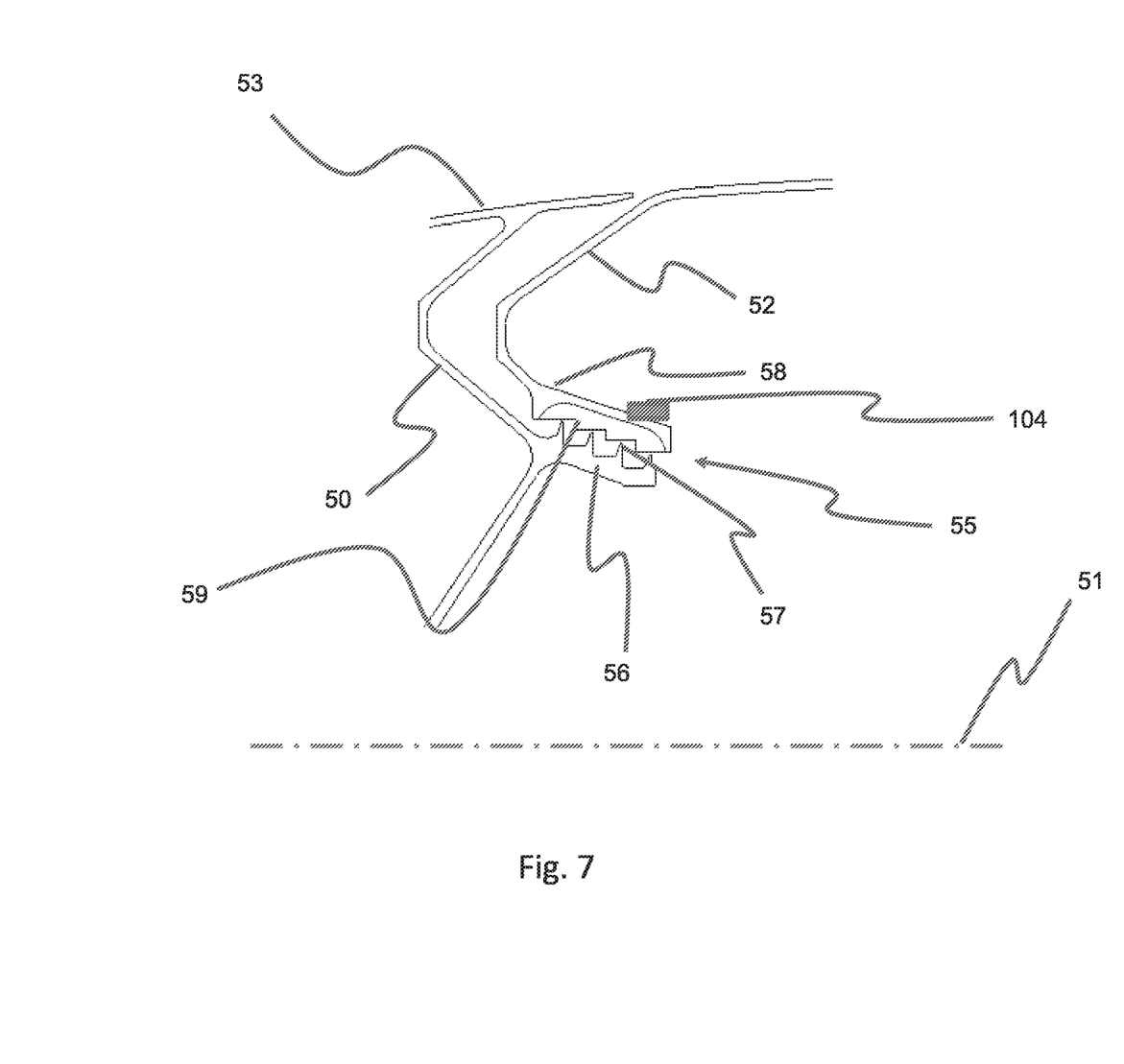
FIG. 7 shows a sectional side view of a seal as described and/or claimed herein wherein the stator sealing component comprises balancing masses.

All the embodiments described so far relate to applying balancing masses to the rotor. However one or more masses can additionally or alternatively be applied to the stator. For example these masses may be equivalent to the balancing masses referred to in relation to the rotor, but which provide no balancing function since the stator is not rotating. Regardless, for consistency with the rotor embodiments discussed, these masses will be hereinafter referred to as balancing masses. Applying balancing masses to the stator can prevent travelling waves from developing in the stator. Therefore flutter (or the effects of flutter) can be minimised or eliminated in the stator by the addition of one or more balancing masses. FIG. 7 shows an embodiment where a balancing mass is applied to the stator 52 instead of the rotor. The arrangement is similar to the arrangement shown in FIG. 4, however FIG. 7 shows a balancing mass 104 attached or integral to the radially outer surface of the stator sealing component 58.

Rotors and/or stators can flutter individually (e.g. by themselves). It is possible that vibration in the rotor can be transferred to the stator through the airflow between the rotor sealing component and the stator sealing component. In this case it is possible that travelling waves in the stator may combine with travelling waves in the rotor to cause flutter. Therefore, for this scenario, the addition of balancing masses to the stator sealing component 58 can minimise the effect of flutter in both the rotor and the stator.

As the stator is not rotating, the balancing masses can be positioned such that the centre of mass of the stator is not coincident with (or does not lie on) the rotor rotational axis 51, due to the fact that the stator does not need to be balanced.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A rotor with a principal axis and a rotational axis, comprising:
a rotor sealing component extending circumferentially around the rotor for sealing between the rotor and a stator, wherein:
the principal axis of the rotor is collinear with the rotational axis;
material of the rotor sealing component is unevenly distributed around the circumference of the rotor sealing component;
the rotor sealing component comprises a plurality of balancing masses at discrete circumferential locations;
the plurality of balancing masses are all the same weight; and
the locations of the balancing masses have an order of rotational symmetry equal to the number of balancing masses.

2. The rotor according to claim 1, wherein the rotor sealing component is a labyrinth seal.

3. The rotor according to claim 1, wherein the rotor sealing component projects away from the rotor, and wherein a portion of the rotor sealing component provides a seal between the rotor and the stator.

4. The rotor according to claim 1, wherein the rotor sealing component comprises an eccentric circumferential mass.

5. A rotor stage for a gas turbine engine comprising:
the rotor according to claim 1; and
a plurality of rotor blades connected to, or integral with, the rotor.

6. A seal comprising:
the rotor according to claim 1; and
the stator, wherein:
the rotor sealing component seals between the rotor and the stator.

7. A gas turbine engine comprising the seal according to claim 6.

8. A method of reducing flutter in a rotor, wherein the rotor comprises a rotor sealing component for sealing with a stator, the method comprising the steps of:
adding a plurality of balancing masses to the rotor sealing component at discrete circumferential locations such that the rotor comprises a principal axis and a rotational axis, comprising:
the rotor sealing component extending circumferentially around the rotor for sealing between the rotor and the stator, wherein: the principal axis of the rotor is collinear with the rotational axis; and material of the rotor sealing component is unevenly distributed around the circumference of the rotor sealing component, wherein
the plurality of balancing masses are all the same weight; and
the locations of the balancing masses have an order of rotational symmetry equal to the number of balancing masses.

* * * * *